(12) United States Patent
Golla et al.

(10) Patent No.: US 11,531,550 B2
(45) Date of Patent: Dec. 20, 2022

(54) PROGRAM THREAD SELECTION BETWEEN A PLURALITY OF EXECUTION PIPELINES

(71) Applicant: Cadence Design Systems, Inc., San Jose, CA (US)

(72) Inventors: Robert T. Golla, Austin, TX (US); Christopher Olson, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 17/173,067

(22) Filed: Feb. 10, 2021

(65) Prior Publication Data
US 2022/0137973 A1 May 5, 2022

Related U.S. Application Data

(60) Provisional application No. 63/110,269, filed on Nov. 5, 2020.

(51) Int. Cl.
*G06F 9/38* (2018.01)
*G06F 9/30* (2018.01)
*G06F 9/48* (2006.01)

(52) U.S. Cl.
CPC .......... *G06F 9/3851* (2013.01); *G06F 9/3009* (2013.01); *G06F 9/30196* (2013.01); *G06F 9/382* (2013.01); *G06F 9/3836* (2013.01); *G06F 9/4818* (2013.01); *G06F 9/4843* (2013.01)

(58) Field of Classification Search
CPC .............................. G06F 9/3851; G06F 9/382
See application file for complete search history.

(56) References Cited

U.S. PATENT DOCUMENTS

| | | | |
|---|---|---|---|
| 5,956,747 A * | 9/1999 | Wilhelm | G06F 12/0848 711/140 |
| 8,533,505 B2 | 9/2013 | Greenhalgh | |
| 8,769,246 B2 | 7/2014 | Golla | |
| 2006/0004995 A1 * | 1/2006 | Hetherington | G06F 9/3851 712/235 |
| 2011/0093857 A1 * | 4/2011 | Sydow | G06F 9/3851 718/102 |

* cited by examiner

*Primary Examiner* — William B Partridge
(74) *Attorney, Agent, or Firm* — Mark H. Whittenberger; Holland & Knight LLP (57) ABSTRACT

Techniques are disclosed relating to an apparatus that includes a plurality of execution pipelines including first and second execution pipelines, a shared circuit that is shared by the first and second execution pipelines, and a decode circuit. The first and second execution pipelines are configured to concurrently perform operations for respective instructions. The decode circuit is configured to assign a first program thread to the first execution pipeline and a second program thread to the second execution pipeline. In response to determining that respective instructions from the first and second program threads that utilize the shared circuit are concurrently available for dispatch, the decode circuit is further configured to select between the first program thread and the second program thread.

20 Claims, 8 Drawing Sheets

```
┌─────────────────────────────────────────────────────────────────┐
│ assigning, by a decode circuit, a first and a second program    │
│ thread to, respectively, a first and a second execution pipeline│
│                              610                                │
└─────────────────────────────────────────────────────────────────┘
                                  │
                                  ▼
┌─────────────────────────────────────────────────────────────────┐
│ accessing, by the decode circuit, a priority value indicating   │
│ whether the first program thread or the second program thread   │
│ has priority to use a shared hardware circuit                   │
│                              620                                │
└─────────────────────────────────────────────────────────────────┘
                                  │
                                  ▼
┌─────────────────────────────────────────────────────────────────┐
│ in response to determining that respective available            │
│ instructions from the first and second program threads would    │
│ concurrently access the shared hardware circuit, selecting, by  │
│ the decode circuit using the priority value, either the first   │
│ program thread or the second program thread                     │
│                              630                                │
└─────────────────────────────────────────────────────────────────┘
```

```
In response to selecting between the first program thread and the second
program thread, updating, by the decode circuit, a stored value indicating which
of the first program thread and the second program thread was most recently
selected.
710
```

↓

```
Determining, by the decode circuit, that an instruction for the first program thread
is not ready for dispatch.
720
```

↓

```
Dispatching instructions for the second program thread to the first and second
execution pipelines.
730
```

↓

```
Updating, by the decode circuit, the stored value to indicate that the second
program thread was most recently selected.
740
```

FIG. 7

FIG. 8 ated to specific tasks and/or types of instruc-
PROGRAM THREAD SELECTION BETWEEN A PLURALITY OF EXECUTION PIPELINES

RELATED APPLICATION

The present application claims priority to U.S. Provisional Appl. No. 63/110,269, filed Nov. 5, 2020, the disclosure of which is incorporated by reference herein in its entirety.

BACKGROUND

Technical Field

This disclosure relates to processing in computer systems and more particularly to program thread selection in a multithreaded processor.

Description of the Related Art

Modern computer systems may be configured to perform a variety of tasks. To accomplish such tasks, a processor in a computer system may include a variety of processing circuits, along with various other circuit blocks. For example, a particular processor may include multiple execution pipelines, each configured to perform respective instructions. In some processors, some execution pipelines may be dediction pipelines may be utilized for general tasks. For example, a particular processor may include a load-store pipeline for reading and writing data to one or more memory circuits, a floating-point arithmetic pipeline, a multiply and/or divide circuits, two or more execution pipelines for general instruction execution, and the like.

To increase a processing bandwidth, a processor may be capable of multithreaded operation. In multithreaded operation, the processor is able to concurrently process instructions from two or more program threads, thereby allowing the processor to utilize more of the execution pipelines at one time, which may result in a reduced total processing time for executing the two or more program threads. Multithreaded operation, however, may lead to potential conflicts if two or more threads have respective ready-to-dispatch instructions that utilize a common pipeline.

SUMMARY OF THE EMBODIMENTS

Various embodiments of a processor are disclosed. Broadly speaking, apparatus, and methods are contemplated in which an embodiment of an apparatus includes a plurality of execution pipelines, including first and second execution pipelines configured to concurrently perform operations for respective instructions, a shared circuit shared by the first and second execution pipelines, and a decode circuit. The decode circuit may be configured to assign a first program thread to the first execution pipeline and a second program thread to the second execution pipeline. The decode circuit may be further configured to, in response to determining that respective instructions from the first and second program threads are concurrently available for dispatch, select between the first program thread and the second program thread, wherein the respective instructions utilize the shared circuit.

In one example, the shared circuit may be configured to perform a particular subset of instructions not executable by the plurality of execution pipelines. To determine that the respective instructions utilize the shared circuit, the decode circuit may be further configured to determine that the respective instructions are included in the particular sub set.

In another example, the shared circuit may be accessed via the first execution pipeline. The decode circuit may be further configured to, in response to an indication that the second program thread has priority, assign the second program thread to the first execution pipeline.

In one embodiment, to select between the first program thread and the second program thread, the decode circuit may be further configured to, prior to fetching the respective instructions, determine a priority between the first program thread and the second program thread. In a further example, to determine the priority, the decode circuit may be further configured to utilize a stored value indicative of which of the first program thread and the second program thread were least recently fetched. In response to making a selection between the first program thread and the second program thread, the decode circuit may also be configured to update the stored value to indicate which of the first program thread and the second program thread was selected.

In an embodiment, the decode circuit may be further configured to swap the assignment of the first and second program threads between the first and second execution pipelines in response to dispatching a particular number of instructions from each thread. In one example, the decode circuit may include respective ready indicators that indicate whether a respective instruction is ready to dispatch for the first and second program threads. The decode circuit may be further configured to, in response to a selection of the first program thread, clear the respective ready indicator corresponding to the second program thread to indicate that an instruction for the second program thread is not ready for dispatch.

DETAILED DESCRIPTION OF EMBODIMENTS

Some processors that support multithreaded operation may include a single execution pipeline, resulting in serial processing of program threads when the program threads each have integer and/or Boolean types of instructions to process. Benefits of multithreading, in such processors, may be achieved when one thread issues an instruction that utilizes a different pipeline than the execution pipeline, e.g., a load-store or multiply pipelines. Performance benefits may be gained when different types of instructions are issued in parallel by the program threads. In cases in which a majority of instructions utilize the execution pipeline, performance benefits may be limited.

To improve bandwidth, other multithreaded processors may include a plurality of execution pipelines to support parallel processing of a plurality threads. Having multiple symmetric execution pipelines may allow a processor to gain performance benefits even when program threads are issuing similar types of instructions. Program threads may be assigned to a respective execution pipeline through which the respective instructions may be performed. If an instruction is issued from a thread that uses a different pipeline, e.g., a read instruction for a load-store pipeline, that the assigned execution pipeline may be stalled during the read operation. Concurrently, an execution pipeline assigned to a different thread may continue to process that thread's instructions. Execution pipelines, however, may be larger than other types of pipelines due to supporting a wide range of instructions. Having multiple execution pipelines may therefore have a detrimental impact on die size and power consumption of a processor.

One strategy for reducing an impact on die size and power management in a multithreaded processor, while maintaining support for multithreaded operation, is to implement asymmetrical execution pipelines. "Asymmetrical execution pipelines," as used herein, are two or more pipelines that support different sets of instructions. In some embodiments, asymmetrical execution pipelines may support different instruction set architectures (ISAs). In other embodiments, including embodiments disclosed herein, asymmetrical execution pipelines support similar ISAs, in which at least one execution pipeline supports only a subset of the ISA. For example, a pair of asymmetric pipelines may both support a first set of instructions, but only a first pipeline of the pair supports a second set of instructions. The first set of instructions may include commonly utilized instructions while the second set may include fewer common instructions and/or instructions that require larger logic circuits to perform. Using such a combination of execution pipelines may allow a processor to gain performance benefits from using two or more execution pipeline without a die size and power consumption penalty from using symmetrical execution pipelines.

Using a pair of symmetrical execution pipelines, two threads may be assigned to a respective one of the execution pipelines until the thread completes. Using a pair of asymmetrical execution pipelines, a first thread may be assigned to the full ISA pipeline and a second thread assigned to the reduced ISA pipeline. If, however, the second thread has an instruction to issue that is not supported by the reduced ISA, then the second thread needs to be reassigned to the full ISA pipeline. The current inventors have recognized a need for a capability to arbitrate between a plurality of threads for use of a full ISA pipeline as well as a capability to swap thread assignments on each instruction cycle.

To support thread reassignment on a cycle-by-cycle basis, a technique is proposed that includes assigning a first and a second program thread to, respectively, a first and a second execution pipeline. A priority value may be accessed that indicates whether the first program thread or the second program thread has priority to use a shared hardware circuit. In response to determining that respective available instructions from the first and second program threads would concurrently access the shared hardware circuit, either the first program thread or the second program thread is selected based on this priority value.

It is noted that, as used herein, "concurrent" refers to events or actions that overlap in time. It is not intended to imply that such events or actions must begin and/or end simultaneously, although simultaneous occurrences are not excluded. For example, first and second instructions may be performed concurrently when the second instruction is issued to a second execution pipeline before the first, previously-issued, instruction completes in a first execution pipeline.

It is also noted that a "program thread" (or simply "thread"), as used herein, refers to a portion of a program or process that may be performed independently of other portions. For example, a subroutine, or portion thereof, may be identified as a thread and therefore, instructions of the thread are allowed to be processed independently and potentially concurrent with instructions from other portions.

Figure 1:
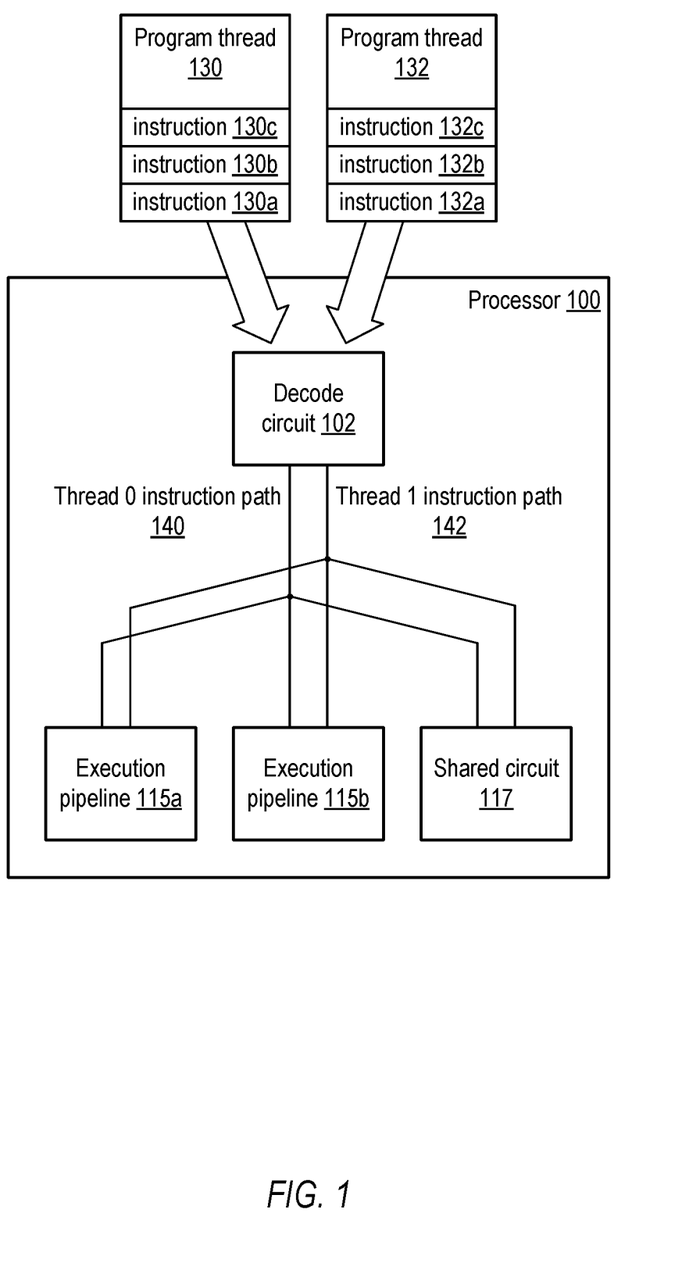
FIG. 1 is a block diagram of an embodiment of a processor.
Figure 2:
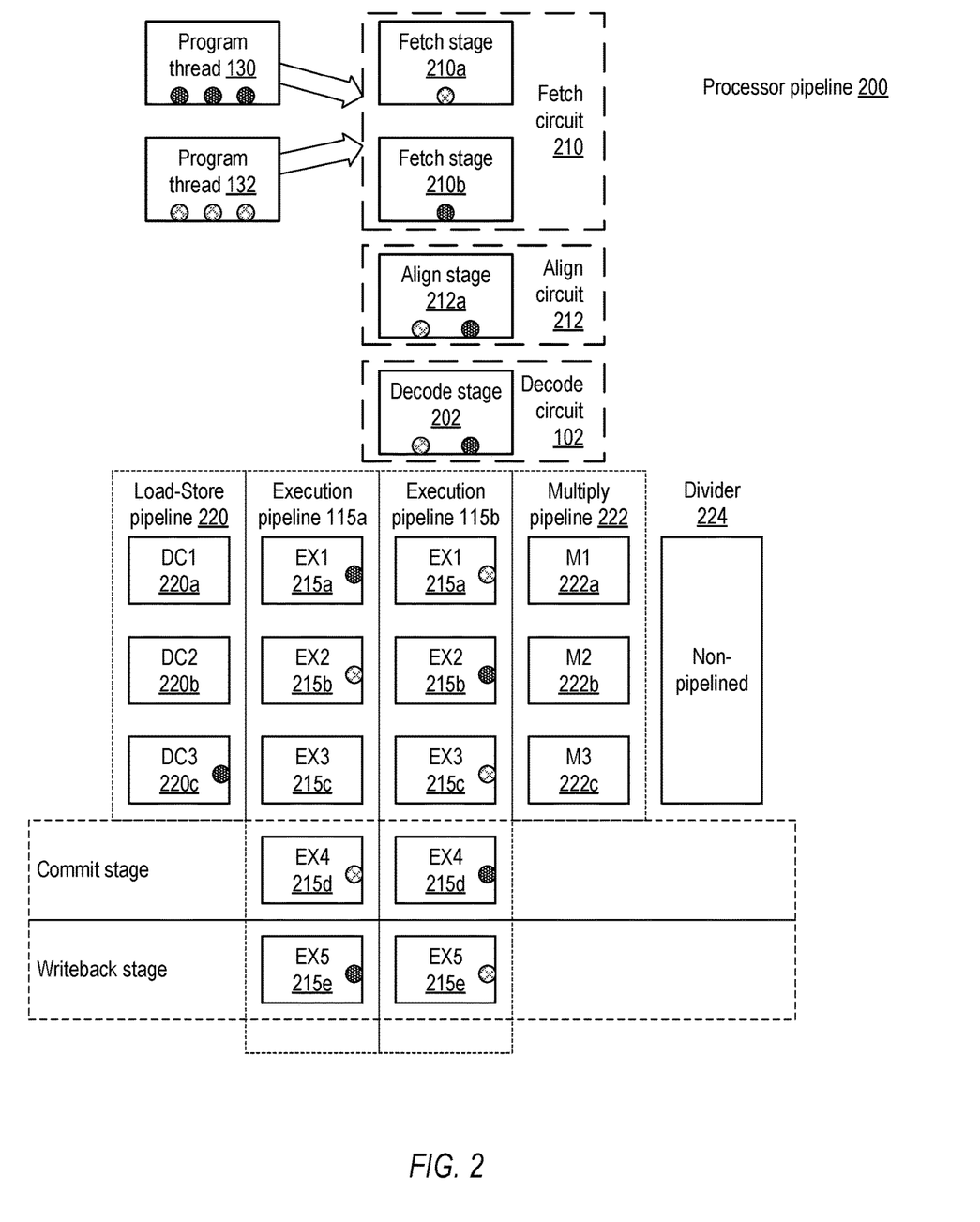
FIG. 2 illustrates a block diagram of an embodiment of a processor pipeline.
Figure 3:
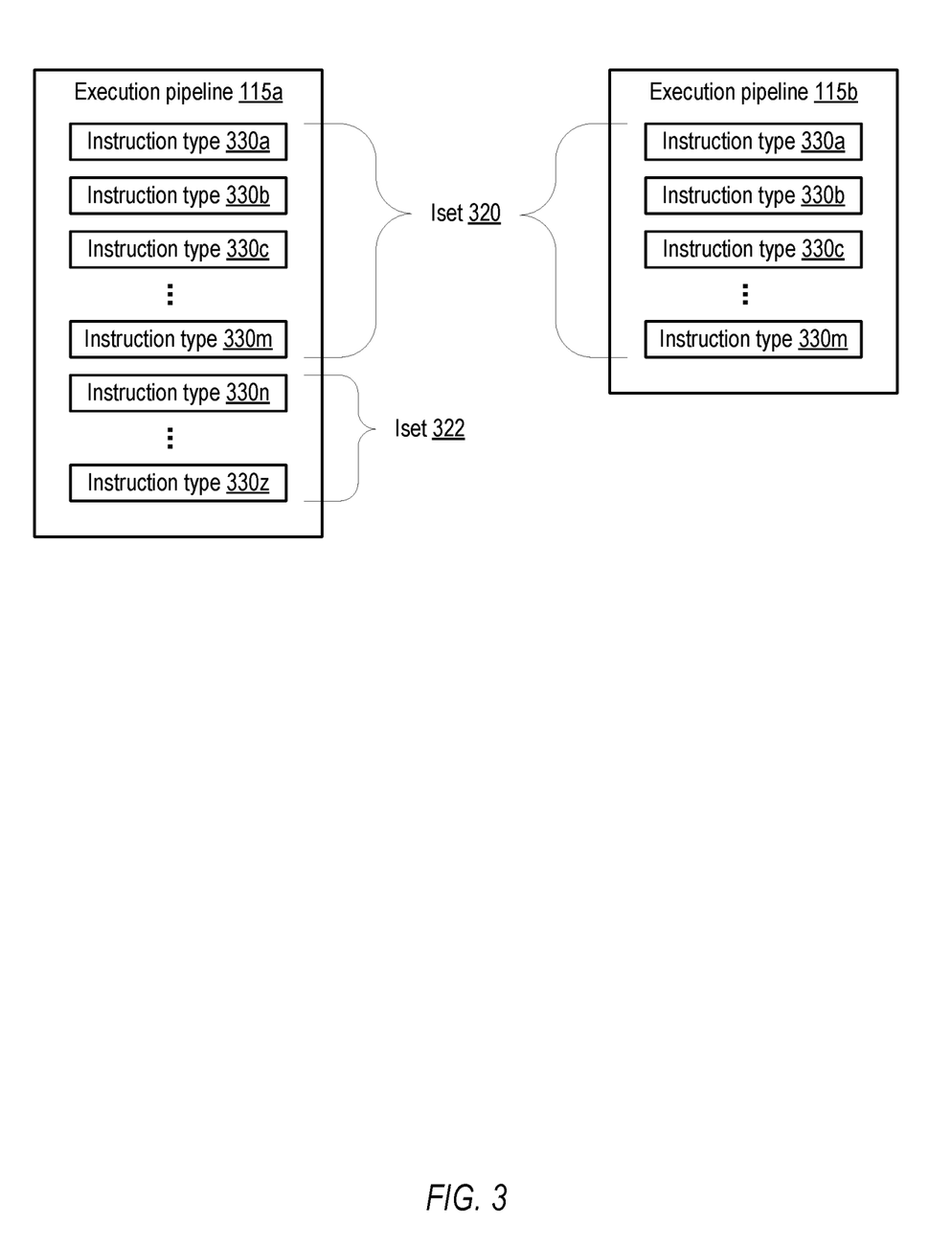
FIG. 3 depicts an embodiment of two execution pipelines and associated instruction sets.
Figure 4:
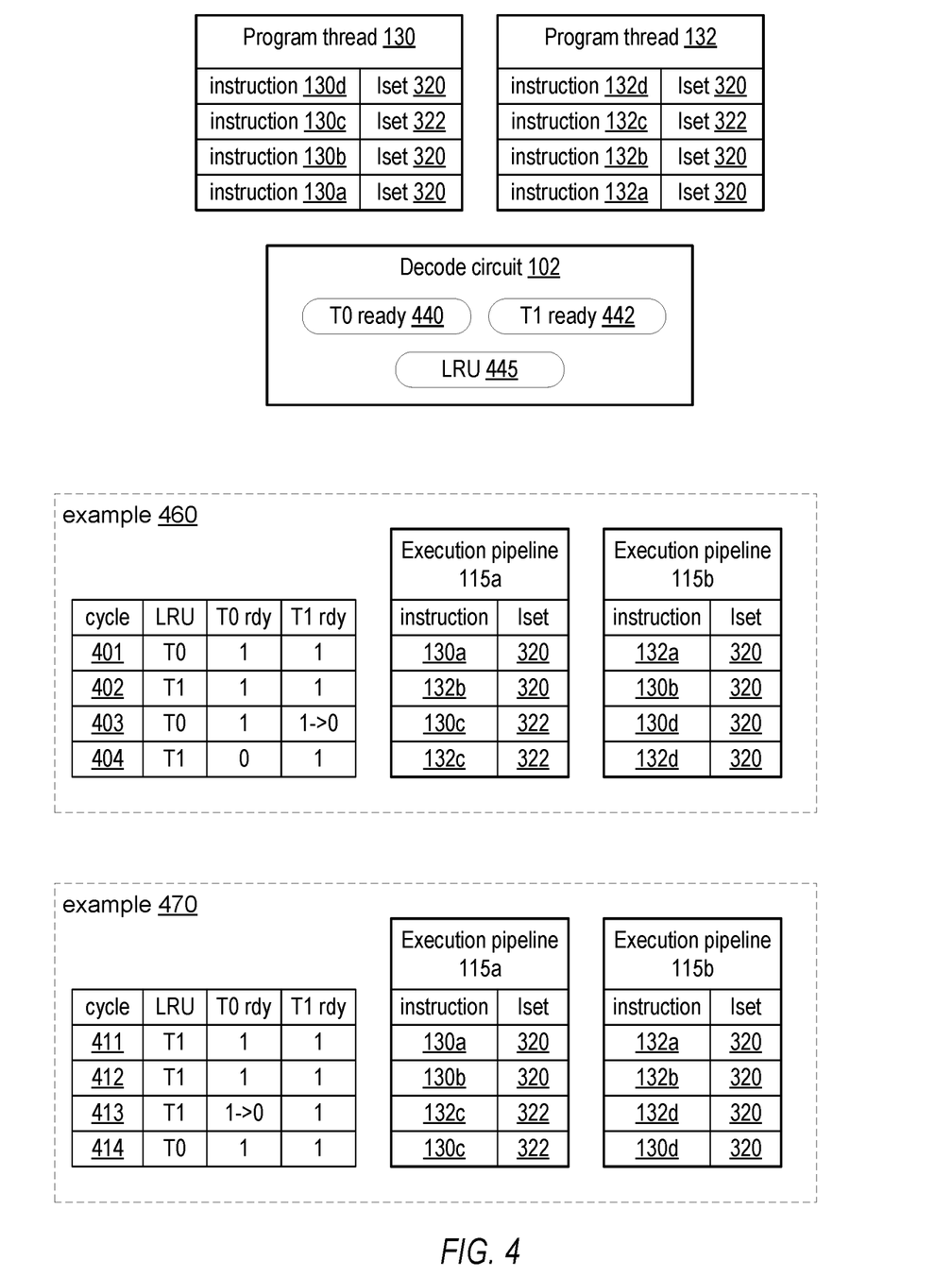
FIG. 4 shows an embodiment of a decode circuit and two examples of instruction flow for two program threads.
Figure 5:
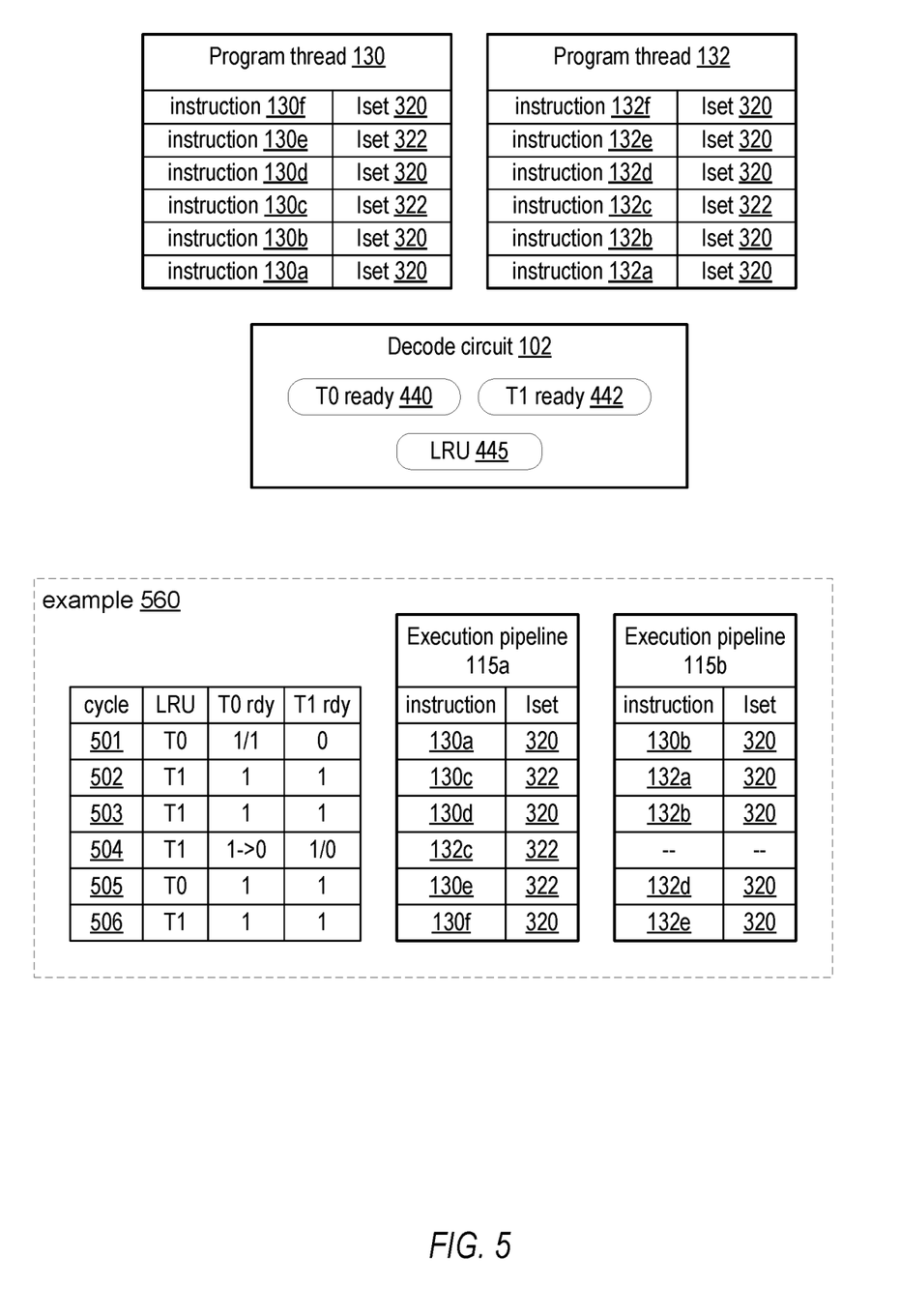
FIG. 5 illustrates an embodiment of another example of instruction flow for two program threads.
Figure 6:
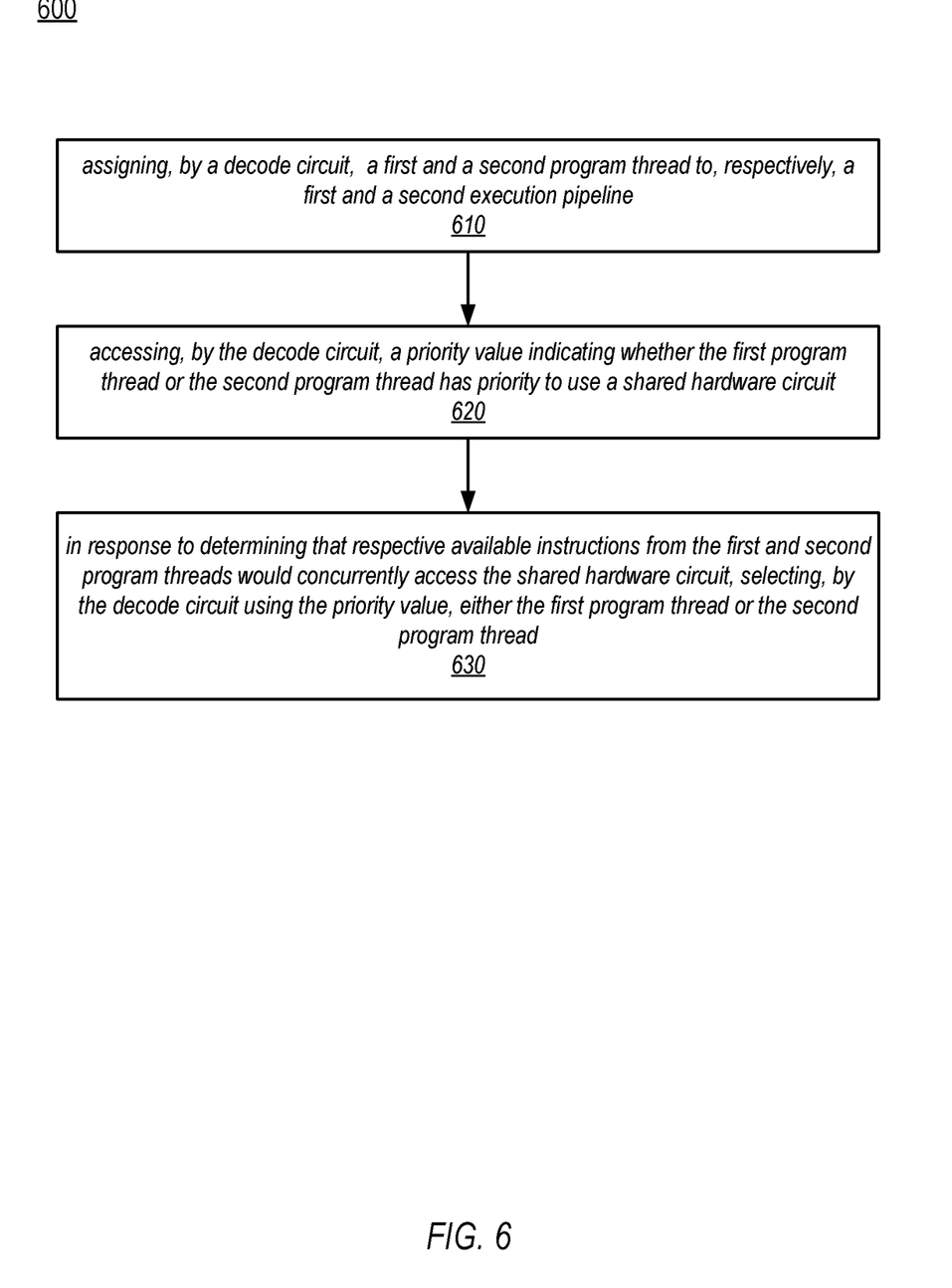
FIG. 6 depicts a flow diagram depicting an embodiment of a method for selecting, by a processor, a program thread.
Figure 7:
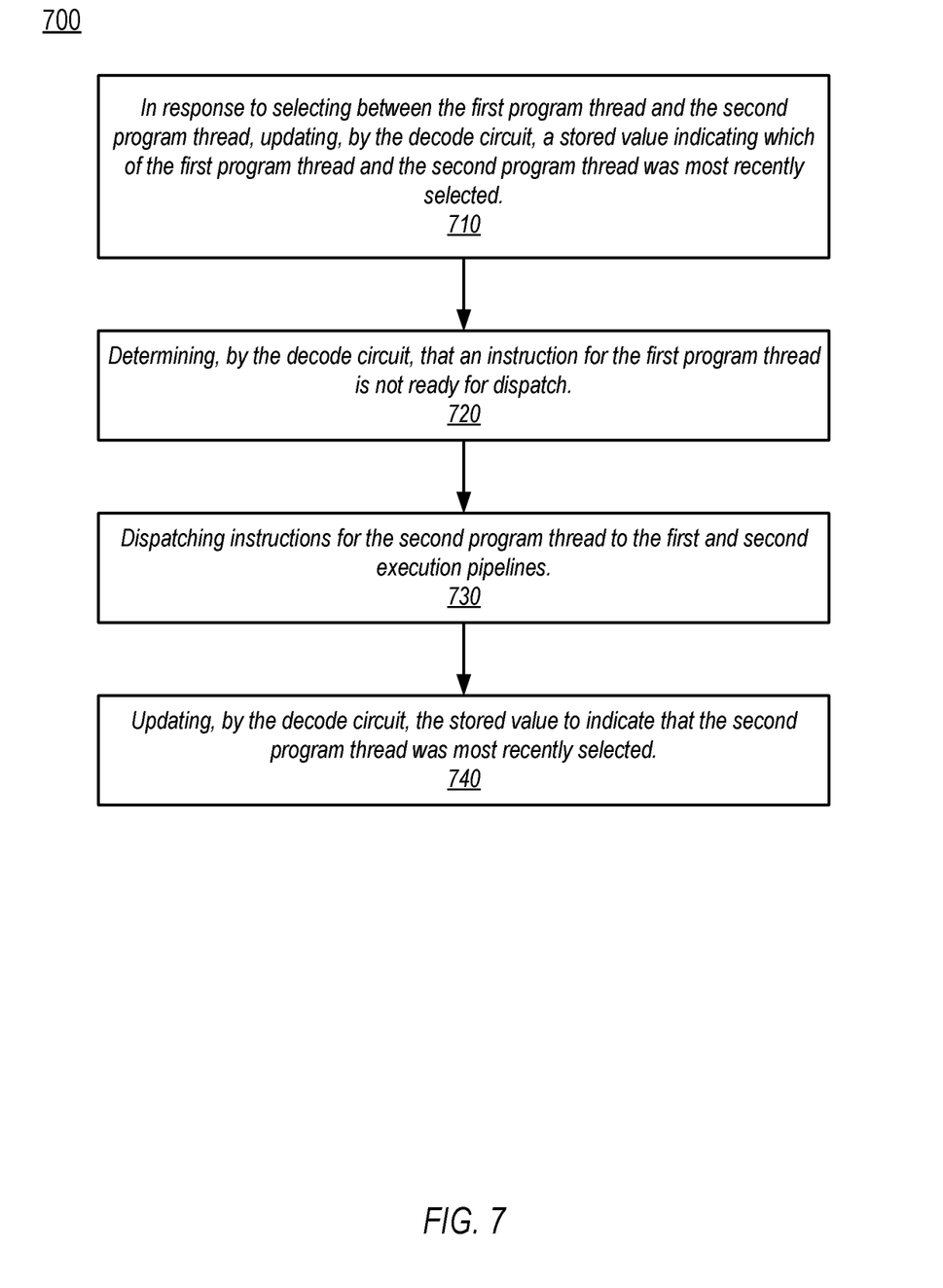
FIG. 7 shows a flow diagram depicting an embodiment of a method for updating, by a processor, a program thread selection.
Figure 8:
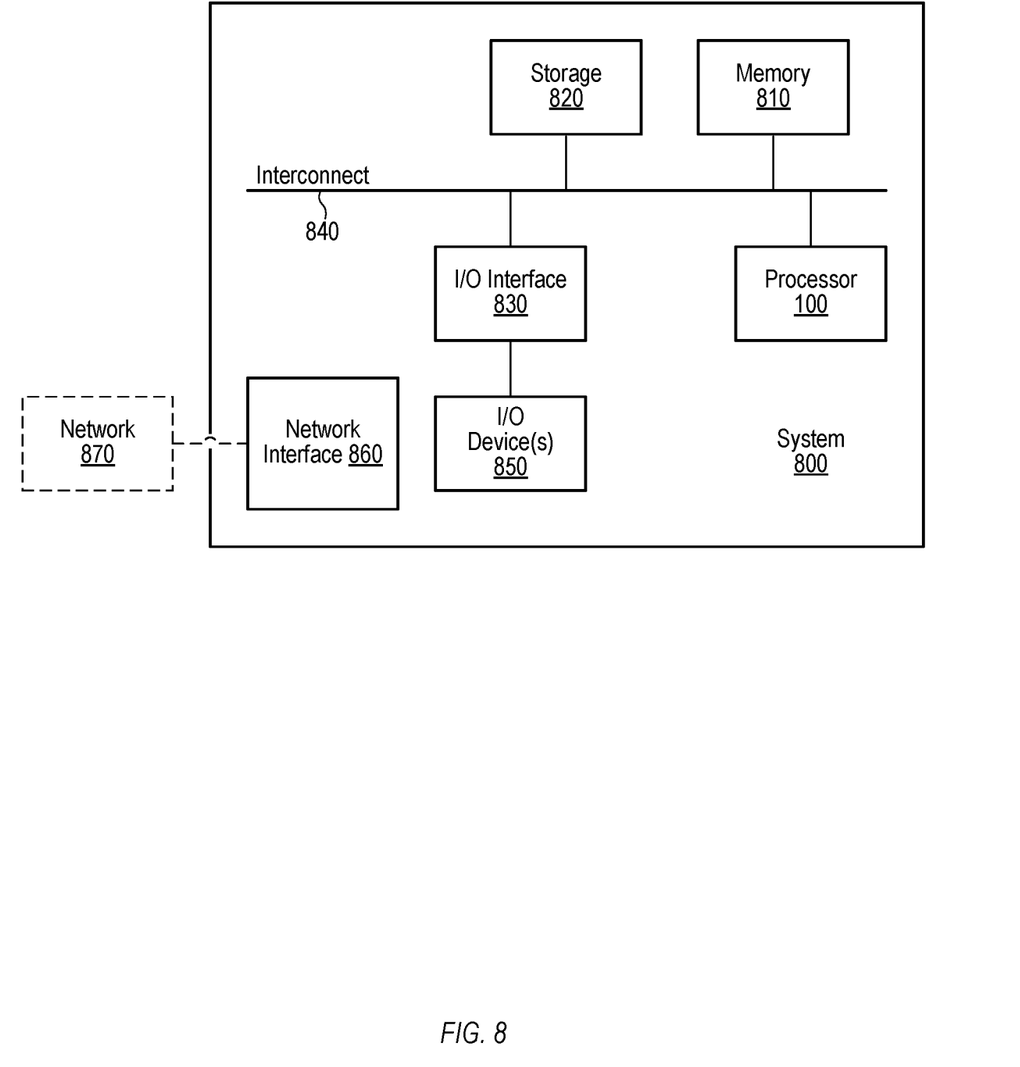
FIG. 8 depicts a block diagram of another embodiment of a computer system.

This disclosure initially describes, with reference to FIGS. 1 and 2, embodiments of a processor and an example processor pipeline. With reference to FIGS. 3-5, the disclosure describes an example of instruction sets and several examples of how instructions of these instruction sets may be arbitrated through portions of the processor. FIGS. 6 and 7 show example methods. FIG. 8 provides an example system configuration in which the disclosed processor may be employed.

Processor Overview

A block diagram depicting an embodiment of processor is illustrated in FIG. 1. As shown, processor 100 includes decode circuit 102, execution pipelines 115a and 115b, and shared circuit 117. Decode circuit 102 receives instructions 130a-130c and 132a-132c from respective program threads 130 and 132, decodes the received instructions, and issues decoded instructions to one of execution pipelines 115a, 115b, or shared circuit 117. Execution pipelines 115a and 115b, and shared circuit 117 may collectively be referred to as execution units. Processor 100 may be used in any suitable computer system, including desktop computers, laptop computers, tablet computers, smartphones, and the like. In various embodiments, processor 100 may be implemented as a main processor in such computing systems or as a controller for one or more peripheral devices, including for example, storage devices.

As shown, processor 100 is configured to support multithreaded operation, including for example, assignment of respective program threads to each of execution pipelines 115a and 115b. Execution pipelines 115a and 115b are configured to concurrently perform operations for respective instructions. To perform instructions, execution pipelines 115a and 115b are configured to implement at least portions of the RISC-V instruction set architecture (ISA), although in other embodiments, different ISAs may be implemented.

As shown in more detail in FIG. 2, each of execution pipelines 115a and 115b may include a plurality of stages for processing respective ones of instructions from program threads 130 and 132. Execution pipelines 115a and 115b may be capable of processing their respective instructions concurrently. The respective stages include a number of circuits configured to perform various aspects of instruction execution. Execution of an instruction through these various processing stages is referred to herein as "performing" an instruction.

Shared circuit 117, as shown, is shared by execution pipelines 115a and 115b. Shared circuit 117 includes one or more stages for performing a particular subset of instructions that are not executable by execution pipelines 115a and 115b. For example, shared circuit 117 may be a load-store pipeline configured to perform read, write, and modify instructions, or shared circuit 117 may be a floating-point pipeline configured to perform floating-point arithmetic instructions. In some embodiments, shared circuit 117 may be a multiply and accumulate pipeline configured to perform multiply instructions and add results to an accumulator. In other embodiments, shared circuit 117 may be used to implement multiply, divide, square root, or other similar functions or combinations thereof. Such functions may or may not be pipelined, based on a number of cycles to complete particular pipeline stages. For example, shared circuit 117, in some embodiments, may be included as a part of execution pipeline 115a, and configured to perform a subset of the particular ISA that are not supported by execution pipeline 115b. Whether shared circuit 117 is included as part of execution pipeline 115a or is implemented as a separate circuit, use of shared circuit 117, as illustrated, may be limited to a program thread that is assigned to execution pipeline 115a.

Decode circuit 102 is configured to retrieve instructions 130a-130c and 132a-132c from respective program threads 130 and 132. As illustrated, the instructions for program threads 130 and 132 are fetched by processor 100 and stored into respective fetch buffers. Decode circuit 102 decodes instructions for program threads 130 and 132 and stores decoded, ready-to-issue instructions in respective instruction buffers for each thread. Decode circuit 102 issues respective instructions to an assigned one of the execution units when the assigned pipeline is ready to receive a next instruction. The decoded instructions for program thread 130 are sent to their assigned execution unit via thread 0 instruction path 140, while decoded instructions for program thread 132 are similarly sent via thread 1 instruction path 142.

To issue instructions 130a-130c and 132a-132c from respective program threads 130 and 132, decode circuit 102 is further configured to assign program thread 130 to execution pipeline 115a and program thread 132 to execution pipeline 115b. If both instructions 130a and 132a are ready to dispatch, and instructions 130a and 132a can be performed by their respective assigned execution pipelines 115a and 115b, then decode circuit 102 respectively issues instruction 130a to execution pipeline 115a and instruction 132a to execution pipeline 115b. In response to determining that instructions 130b and 132b from program threads 130 and 132, respectively, are concurrently available for dispatch, and that instructions 130b and 132b both utilize shared circuit 117, decode circuit 102 selects between program thread 130 and program thread 132. To determine that instructions 130b and 132b utilize shared circuit 117, decode circuit 102 may be configured to determine that instructions 130b and 132b are included in the particular subset of instructions performed by shared circuit 117 and not by execution pipelines 115a and 115b.

In some embodiments, to select between program thread 130 and program thread 132, decode circuit 102 is further configured to determine a priority between program threads 130 and 132 prior to fetching instructions 130b and 132b. Decode circuit 102, for example, may utilize a stored value indicative of which of program thread 130 and program thread 132 were least recently fetched. When instructions 130b and 132b are determined to both utilize shared circuit 117, decode circuit 102 has the information to make the selection between the two program threads with little to no delay, thereby allowing the selected thread to utilize shared circuit 117 without skipping an instruction cycle of the processor.

In response to making this selection between program thread 130 and program thread 132, decode circuit 102 is, as shown, configured to update the stored value to indicate which one of program threads 130 and 132 was selected. This update may be made such that the updated value of stored value is valid at the beginning of a next instruction cycle. Accordingly, decode circuit 102 may access the updated value for the subsequent cycle. The stored value may be stored in storage circuitry (including, e.g., a flip-flop circuit or a data latch circuit) that is implemented in decode circuit 102 or in another location within processor 100.

It is noted that the processor of FIG. 1 is merely an example for illustrating the disclosed concepts. In other embodiments, additional circuits may be included. For example, FIG. 1 only shows portions of a processor pipeline, omitting various circuits for clarity, such as instruction fetching and alignment circuits. Processors, such as those described in regard to FIG. 1, may be designed according to various design styles based on performance goals, desired power consumption, and the like. An example of a processor pipeline is described below in regards to FIG. 2.

Moving to FIG. 2, an embodiment of a pipeline diagram illustrating the execution timing of an embodiment of a processor pipeline is shown. Processor pipeline 200 is, as shown, included in processor 100 in FIG. 1. Instruction execution proceeds from top to bottom in a nine-stage pipeline, and each row of FIG. 2 represents one execution cycle. Processor pipeline 200 includes fetch circuit 210 performing fetch stages 210a and 210b, and align circuit 212 performing align stage 212a. Decode circuit 102 of FIG. 1 performs decode stage 202. Five execution circuits are shown for performing instructions of the supported ISA: execution pipelines 115a and 115b, load-store pipeline 220, multiply pipeline 222, and divider circuit 224. In some embodiments, any one or more of load-store pipeline 220, multiply pipeline 222, and divider circuit 224 may be included in shared circuit 117. Shared circuit 117 may, in some embodiments, include a portion of execution pipeline 115a configured to perform instructions that are not supported by execution pipeline 115b.

As illustrated, the operation of fetch circuit 210 is split across two cycles as denoted by fetch stages 210a and 210b, during which instruction memory access occurs (e.g., to a cache, a local memory, a system memory, and the like) and fetch buffers containing unaligned fetch results are populated. A stall may occur at the fetch stage 210a stage in the event of a cache miss or line fill condition. Instructions from program threads 130 and 132 may be concurrently fetched and stored in respective fetch buffers.

Operation of align circuit 212 occurs in align stage 212a. A stall may occur here in certain cases of misalignment. For example, if multiple fetch buffers need to be scanned to identify instructions to be decoded, a stall may be necessary.

Decode circuit 102 is in operation during decode stage 202. In one embodiment, decode circuit 102 attempts to identify up to two instructions that can be issued together for execution, subject to dependencies, although other embodiments may attempt to identify greater degrees of concurrency. Stalls may occur at the decode stage 202 based on dependencies, instruction synchronization requirements, or other factors.

Following decode stage 202, processing depends upon which execution circuit an instruction is routed to. Instructions destined for execution pipelines 115a or 115b enter the EX1 stage 215a of the respective pipeline. In one embodiment, execution pipelines 115a or 115b may each include two arithmetic logic units (ALUs), one of which executes at EX1 stage 215*a*, and the other of which executes at the EX4 stage 215*d*. As can be seen relative to the other execution circuit pipelines, including an ALU at EX4 stage 215*d* may enable forwarding of results from other execution circuits, and may prevent some instances of dependency-related stalls.

As shown, instruction commit decisions occur during EX4 stage 215*d*, also referred to herein as the commit stage. For example, by the end of EX4 stage 215*d*, all speculative conditions that would prevent an instruction result from properly being committed to architectural state (such as branch mispredictions, exceptions, interrupts, or similar conditions) should be resolved. Either invalid state will be flushed or the instruction currently at EX4 stage 215*d* will be permitted to modify architectural state at EX5 stage 215*e*, also referred to herein as the writeback stage. As used herein, an "architectural state" refers to logic states of a processor core, including registers such as condition code and other status registers and register files used for storing instruction operands and results.

Load and store instructions, as illustrated, enter DC1 stage 220*a* of load-store pipeline 220 and proceed to perform address generation and data cache/close-coupled memory lookup. In the illustrated case, loads and stores are effectively complete at DC3 stage 220*c* and can be forwarded, although they still need to proceed to the commit and writeback stages before they can be allowed to persistently modify architectural state.

Multiply instructions enter M1 stage 222*a* of multiply pipeline 222. As shown, multiply pipeline 222 has similar timing to the load-store pipeline 220, with results available for forwarding at M3 stage 222*c*. Like load and store instructions, however, multiply instructions may proceed to the commit and writeback stages prior to persistently modifying architectural state.

In some embodiments, load-store pipeline 220 and execution pipeline 115*a* may be treated as a unit for instruction issue purposes. That is, during a given cycle, decode circuit 102 may issue an instruction to one of these pipelines, but not the other. Execution pipeline 115*a* and multiply pipeline 222 may similarly be treated as a unit, such that decode circuit 102 may issue up to two instructions per cycle for execution. In other embodiments, more aggressive issue scheduling may be implemented.

As shown, divide instructions are issued from decode circuit 102 to divider circuit 224. In the illustrated embodiment, divide operations are long-latency, unpipelined operations. For completeness, the divider path is shown in FIG. 2 as an issue path alongside the remaining execution pipelines.

As disclosed above, execution pipelines 115*a* and 115*b* are configured to concurrently perform operations for a first set of instruction types. Execution pipeline 115*a* is further configured to perform operations for a second set of instruction types, different than the first set. Accordingly, execution pipeline 115*a* and execution pipeline 115*b* are asynchronous execution pipelines, with execution pipeline 115*a* being capable of performing a greater number of instruction types than execution pipeline 115*b*. For example, divider-type instructions and/or control and status register-type instructions may be included in second set of instruction types and, therefore, performed only by execution pipeline 115*a*.

Decode circuit 102 is configured to assign program thread 130 to execution pipeline 115*a* and program thread 132 to execution pipeline 115*b*. As shown in FIG. 2, instructions included in program thread 130 are indicated by the darker shaded circles while instructions included in program thread 132 are indicated by the lighter shaded circles. In the first execution stage, EX1 215*a*, an instruction of program thread 130 is shown in execution pipeline 115*a* and an instruction of program thread 132 is shown in execution pipeline 115*b*. These instructions are dispatched in to the respective execution pipelines by decode circuit 102.

Decode circuit 102 is further configured to select between program thread 130 and program thread 132 in response to determining that respective instructions from the program threads 130 and 132 are concurrently available for dispatch, wherein the respective instructions are both included in the second set. If instructions from both program threads are in decode stage 202, ready for dispatch, and both instructions are included in the second set of instruction types that are performed by execution pipeline 115*a* and cannot be performed by execution pipeline 115*b*, then decode circuit 102 makes a selection between the two program threads to determine which instruction is permitted to move forward. For example, a least recently used algorithm may be used to determine that program thread 130 has had the most recent access and program thread 132 has had the least recent access to execution pipeline 115*a*, between these two program threads. Accordingly, decode circuit 102 may select the instruction from program thread 132 to dispatch to execution pipeline 115*a* while the instruction from program thread 130 is stalled in decode stage 202.

As another example, program thread 130, as shown in the EX1 215*a* pipeline stage, is assigned to execution pipeline 115*a* and program thread 132 is assigned to execution pipeline 115*b*. Decode circuit 102 determines that a ready-to-dispatch first instruction of program thread 130 is included in the first set of instruction types and that a ready to dispatch second instruction of the second program thread is included in the second set of instruction types. In response to this determination, decode circuit 102 is configured to swap execution pipeline assignments of program threads 130 and 132. Accordingly, decode circuit 102 may select the instruction from program thread 132 to dispatch to execution pipeline 115*a*, and dispatch the instruction from program thread 130 to execution pipeline 115*b*, with no stalls for either program thread.

It is noted that the pipeline depicted in FIG. 2 is presented as an example. Various processor pipelines are known and contemplated for use with the disclosed concepts. In other embodiments, a different number of pipeline stages and/or execution circuits may be included. For example, a multiply and accumulate execution circuit may be included in place of, or in addition to, multiply pipeline 222.

Execution pipelines 115*a* and 115*b* are described above as supporting different sets of instruction types. An example of different instruction types is illustrated in FIG. 3.

Examples of Instruction Sets and Program Thread Arbitration

Turning to FIG. 3, embodiments of two execution pipelines are depicted along with instruction types supported by each pipeline. Execution pipelines 115*a* and 115*b* are shown with respective sets of instruction types, Iset 320 and Iset 322, supported by each.

As illustrated, execution pipelines 115*a* and 115*b* are configured to concurrently perform operations for Iset 320. Iset 320 includes instruction types 330*a*-330*m*, which may include any suitable total number of instruction types. Each of instruction types 330*a*-330*m* may represent one or more instructions. For example, instruction type 330*a* may correspond to a plurality of different add instructions, such as, a byte add, word add, add with carry bit, and the like. Instruction types 330*a*-330*m* may include all or most of a particular ISA, for example, the RISC-V ISA.

Execution pipeline 115a may, as shown, be further configured to perform operations for Iset 322, different than Iset 320. Iset 322 includes instruction types 330n-330z. It is noted that the letters used in the references (e.g., a, b, c, m, n, and z) are not intended to represent any specific value, and instead, any suitable number of instruction types may be included in each set of instruction types, Iset 320 and Iset 322.

Iset 322, in various embodiments, may include a portion of instruction types included in the supported ISA (e.g., a portion of RISC-V instructions) and/or additional instructions created for performing a particular task or activating a particular hardware circuit. For example, one or more of Iset 322 (e.g., instruction type 330z) may cause shared circuit 117 of FIG. 1 to be accessed via execution pipeline 115a. Accordingly, if both program threads 130 and 132 have a next instruction ready to issue that are both instruction type 330z, then decode circuit 102 may be configured, in response to an indication that program thread 132 has priority, to assign program thread 132 to execution pipeline 115a.

It is noted that FIG. 3 is merely an example to demonstrate how different sets of instruction types may be supported by asynchronous execution pipelines. Although execution pipeline 115b is not shown with instruction types that are unsupported by execution pipeline 115a, such an embodiment is contemplated.

FIGS. 1-3 illustrate block diagrams and tables associated with multithreaded, asynchronous execution pipelines. In FIGS. 4 and 5, several examples are depicted that show how thread priority may be utilized in different cases.

Proceeding to FIG. 4, several tables are shown, depicting embodiments of two program threads and two execution pipelines in examples of instruction selection and execution flow. As shown in FIG. 4, two examples, 460 and 470, are presented to illustrate how processor 100 may perform program thread selection in a cycle-by-cycle context. Program threads 130 and 132 are illustrated with four instructions apiece, with each instruction identified as belonging to Iset 320 or Iset 322. In addition, decode circuit 102 is shown with three related control signals, thread 0 (T0) ready 440, thread 1 (T1) ready 442, and least recently used (LRU) 445. Decode circuit 102 includes respective ready indicators, T0 ready 440 and T1 ready 442, that indicate whether a respective instruction is ready to dispatch for program threads 130 and 132. T0 ready 440 indicates that program thread 130 has an instruction ready for dispatch while T1 ready indicates the same for program thread 132. As shown, a value of '1' indicates a respective instruction is ready for dispatch while a value of '0' indicates that an instruction is not ready for the corresponding program thread. Decode circuit 102 includes LRU 445 as an indication of which of the two program threads has waited the longest for selection to execution pipeline 115a. To select between program thread 130 and program thread 132, decode circuit 102 is configured to utilize a stored value corresponding to LRU 445 that indicates whether program thread 130 or program thread 132 was most recently selected.

Example 460 illustrates an embodiment in which decode circuit 102 is configured to swap the assignment of program threads 130 and 132 between execution pipelines 115a and 115b in response to dispatching a particular number of instructions from each thread. In the present example, the particular number is one. As shown in cycle 401, instruction 130a of program thread 130 and instruction 132a of program thread 132 are both ready to dispatch as indicated by the respective T0 ready 440 and T1 ready 442 signals. Decode circuit 102, accesses LRU 445 which indicates that program thread 130 (T0) has waited longer than program thread 132 (T1) for dispatch to execution pipeline 115a. Accordingly, decode circuit 102 selects instruction 130a to dispatch to execution pipeline 115a and assigns instruction 132a to execution pipeline 115b. LRU 445 is updated to indicate that program thread 132 is the least recently used for the next instruction cycle. It is noted that both instructions 130a and 132a belong to Iset 320 of FIG. 3, and therefore, are supported by both execution pipelines.

In the next instruction cycle, cycle 402, decode circuit 102 is further configured to swap the assignment of program threads 130 and 132 between execution pipelines 115a and 115b in response to dispatching the particular number (one in this example) of instructions from each thread. Instructions 130b and 132b are both ready to dispatch as indicated by the respective T0 ready 440 and T1 ready 442 signals. Again, both instructions 130b and 132b belong to Iset 320, and therefore, are supported by both execution pipelines. Based on the updated indication of LRU 445, decode circuit 102 selects instruction 132b of program thread 132 for dispatch to execution pipeline 115a and instruction 130b of program thread 130 for dispatch to execution pipeline 115b. As described above, LRU 445 is updated to indicate that program thread 130 is now the least recently used for the next instruction cycle.

As shown at instruction cycle 403, both program threads 130 and 132 have ready-to-dispatch instructions (130c and 132c, respectively) that belong to Iset 322 which may be performed by execution pipeline 115a, but not execution pipeline 115b. Using an updated value of LRU 445, decode circuit 102 selects instruction 130c of program thread 130 to assign to execution pipeline 115a. Decode circuit 102 is further configured, in response to the selection of program thread 130, to clear T1 ready 442 corresponding to program thread 132 to indicate that instruction 132c of program thread 132 is not ready for dispatch. Since instruction 132c cannot be performed by execution pipeline 115b, and execution pipeline 115a is assigned to program thread 130 for instruction cycle 403, instruction 132c isn't ready for dispatch. As shown, decode circuit 102 instead dispatches instruction 130d of program thread 130 to execution pipeline 115b, resulting in program thread 130 being assigned to both execution pipelines 115a and 115b for the current instruction cycle.

In the subsequent instruction cycle 404, T1 ready 442 is set to indicate that instruction 132c is again ready for dispatch. Decode circuit 102 assigns instruction 132c to execution pipeline 115a. In addition, instruction 132d is dispatched to execution pipeline 115b. In some embodiments, instruction 132d may be dispatched instead of a next instruction of program thread 130 due to program thread 130 not having an instruction ready to dispatch (as indicated by T0 ready 440 in cycle 404). In other embodiments, decode circuit 102 may select two instructions from program thread 132 in response to dispatching two instructions from program thread 130 in the prior instruction cycle 403.

Example 460 depicts an embodiment in which decode circuit 102 is configured to swap program thread assignments on each instruction cycle in which there is not a conflict for pipeline resources. In other embodiments, instead of swapping every cycle, decode circuit 102 may swap thread assignments after a different number of instruction cycles, e.g., every 2, 4, 10, etc. cycles.

Example 470 illustrates an embodiment in which decode circuit 102 is not configured to swap the assignment of program threads 130 and 132 between the two execution pipelines 115a and 115b after any particular number of instruction cycles. Instead, in example 470, decode circuit 102 is configured to assign program threads 130 and 132 to respective execution pipelines, and maintain these assignments until a thread swap is performed due to a need to perform an instruction of Iset 322. As shown in example 470, decode circuit 102, in cycle 411, assigns instruction 130a of program thread 130 to execution pipeline 115a and instruction 132a of program thread 132 to execution pipeline 115b despite LRU 445 indicating that program thread 132 is the least recently used thread on execution pipeline 115a. Since both instructions 130a and 132a are from Iset 320, there is no resource conflict and the thread assignments may remain the same as in the previous instruction cycle, as illustrated in cycle 412 with the similar assignments of instructions 130b and 132b.

In cycle 413, the ready-to-dispatch instructions from both program threads 130 and 132 are from Iset 322, and, therefore, need to be performed in execution pipeline 115a, thereby creating a resource conflict. Decode circuit 102, as shown, uses a current value of LRU 445 (still indicating that program thread 132 is the least recently used) selects instruction 132c of program thread 132 to assign to execution pipeline 115a. In addition, T0 ready 440 is updated to indicate that instruction 130c is not ready for dispatch since execution pipeline 115a is unavailable and execution pipeline 115b does not support Iset 322 instructions. If, therefore, a next instruction of program thread 132 is ready (instruction 132d), then decode circuit 102 may, as shown, dispatch instruction 132d to execution pipeline 115b. LRU 445 is updated for the subsequent cycle to indicate that program thread 130 is now the least recently used.

In cycle 414, decode circuit 102 dispatches the stalled instruction 132c to execution pipeline 115a. As shown, decode circuit 102 further dispatches instruction 130d to execution pipeline 115b. In some embodiments, a next instruction of program thread 132 (not shown) may be dispatched instead of instruction 130d.

Moving now to FIG. 5, another embodiment of two program threads and two execution pipelines in a third example of instruction selection and execution flow is depicted. Example 560 illustrates another case of processor 100 performing program thread selection in a cycle-by-cycle context. As shown. program threads 130 and 132 are illustrated with five instructions apiece, with each instruction identified as belonging to Iset 320 or Iset 322. Decode circuit 102 is again shown with control signals T0 ready 440, T1 ready 442, and LRU 445.

Example 560 illustrates an embodiment in which decode circuit 102 is configured to determine that an instruction for one program thread is not ready for dispatch, and dispatch instructions for the other program thread to execution pipelines 115a and 115b. As shown in cycle 501, instructions 130a and 130b of program thread 130 is ready to dispatch as indicated by the '1/1' values of T0 ready 440. Instruction 132a of program thread 132 is, however, not ready to dispatch as indicated by the '0' value of T1 ready 442. In response, decode circuit 102, selects both instructions 130a and 130b to dispatch to execution pipeline 115a and execution pipeline 115b, respectively. LRU 445 is updated to indicate that program thread 132 is the least recently used for the next instruction cycle. It is noted that both instructions 130a and 130b belong to Iset 320 of FIG. 3, and therefore, are supported by both execution pipelines.

As shown in cycle 502, the value of T1 ready 442 is '1' indicating that instruction 132a is now ready for dispatch. Instruction 130c is also ready for dispatch and is from Iset 322. Accordingly, decode circuit 102 assigns instruction 130c to be performed in execution pipeline 115a, while instruction 132a of Iset 320, is able to be assigned to execution pipeline 115b. LRU 445 continues to indicate that program thread 132 is the least recently used for execution pipeline 115a, and therefore, has priority in case of a conflict with program thread 132.

In cycle 503, however, there is no conflict between the program threads as both instruction 130d and 132b are from Iset 320, and may be performed by either execution pipeline. Accordingly, program threads 130 and 132 remain assigned to execution pipelines 115a and 115b, respectively. As illustrated in cycle 504, both instructions 130e and 132c are ready to dispatch for program threads 130 and 132, respectively, thereby creating a conflict for use of execution pipeline 115a. Decode circuit 102 uses LRU 445 to select program thread 132 and instruction 132c is assigned to execution pipeline 115a. Decode circuit 102 updates LRU 445 to indicate program thread 130 is least recently used. Furthermore, decode circuit 102 updates T0 ready 440 to indicate that instruction 130e is not available for dispatch this cycle since execution pipeline 115a is not available and execution pipeline 115b does not support Iset 322 instructions. Instruction 132d, the next instruction in program thread 132, is also not available for dispatch. Execution pipeline 115b, therefore, stalls for the current cycle 504 since no instruction from the two program threads being processed is available for dispatch.

In cycle 505, execution pipeline 115a is available to perform instruction 130e, and instruction 132d is now ready to dispatch. Since instruction 130e is from Iset 322 and instruction 132d is from Iset 320, decode circuit 102 assigns instruction 130e to execution pipeline 115a and instruction 132d to execution pipeline 115b. LRU is updated to indicate program thread 132 is least recently used. In cycle 506, the subsequent instructions for each program thread, 130f and 132e, are both from Iset 320 and therefore, no conflict exists for this cycle. The previous cycles thread assignments are maintained, resulting in decode circuit 102 assigning instruction 130f to execution pipeline 115a and instruction 132e to execution pipeline 115b.

It is noted that the examples of FIGS. 4 and 5 are merely for demonstration of the disclosed techniques. Only two program threads and two execution pipelines are shown for clarity. In other embodiments, additional program threads may be supported by the two execution pipelines, or additional pipelines may be included. The examples illustrate instruction assignment for the first stage of the execution pipelines. As shown in FIG. 2, each pipeline may include additional stages used to perform the assigned instructions over the course of multiple instruction cycles.

The circuits and examples described in FIGS. 1-5 may be implemented using various methods. In FIGS. 6 and 7, two methods are presented and described below.

Method for Managing Instruction Dependencies

Turning to FIG. 6, a flow diagram depicting an embodiment of a method for arbitrating thread assignments in a processor is illustrated. Method 600 may be used in conjunction with any of the computer circuitry, systems, devices, elements, or components disclosed herein, among others. In various embodiments, some of the disclosed operations may be performed concurrently, in a different order than shown, or may be omitted. Additional operations of the method may also be performed as desired. Referring collectively to FIGS. 1 and 6, method 600 begins in block 610.

Method 600 includes, at block 610, assigning, by decode circuit 102, program threads 130 and 132 to, respectively, execution pipelines 115a and 115b. As illustrated, decode circuit 102 may use any suitable technique to make initial assignments of program thread 130 and 132 to execution pipelines 115a and 115b, respectively. For example, after a reset or other event that results in two program threads that were not previously assigned to be ready for dispatch, decode circuit 102 may assign program thread 130 to execution pipeline based on a comparison of thread priorities, a comparison of instruction addresses of the ready-to-dispatch instructions, a reset state of LRU 445 in FIGS. 4 and 5, and the like. In other cases, one of two active threads may complete and program thread 132 may, for example, replace the completed thread. In such a case, program thread may be assigned to the same execution pipeline as the completed program thread.

Some embodiments may include swapping, by decode circuit 102, assignment of program threads 130 and 132 between execution pipelines 115a and 115b in response to dispatching a particular number of instructions from each thread. For example, as shown in FIG. 4, thread assignments are swapped every instruction cycle that in which there is not a conflict for use of shared circuit 117.

At block 620, method 600 also includes accessing, by decode circuit 102, a priority value indicating whether program thread 130 or program thread 132 has priority to use shared circuit 117. As shown in FIG. 4, LRU 445 may be used as the priority value for determining which of program threads 130 and 132 has a priority for utilizing shared circuit 117. As previously disclosed, LRU 445 may provide an indication of which active program thread has had the least recent use of shared circuit 117, thereby entitling the least recently used thread a priority to use shared circuit 117 in the event of a conflict between active program threads. In other embodiments, a different technique or additional factors may be used to select between program threads in case of a conflict. For example, a thread priority may be included in the selection. Decode circuit 102 may read a current value of LRU 445 before it is known if a conflict for shared circuit 117 exist in the current instruction cycle.

Method 600, at block 630, further includes, in response to determining that respective available instructions from program threads 130 and 132 would concurrently access shared circuit 117, selecting, by decode circuit 102 using the priority value, either program thread 130 or program thread 132. As illustrated, program threads 130 and 132 are in conflict for use of shared circuit 117, and decode circuit 102, therefore, selects either program thread 130 or 132 using the value of LRU 445 accessed in block 620. In some embodiments, shared circuit 117 is included in execution pipeline 115a, and method 600 further comprises assigning, by decode circuit 102, the selected program thread to execution pipeline 115a. For example, shared circuit 117 may include logic circuits for performing one or more instructions included in Iset 322. In some embodiments, these logic circuits may be included in execution pipeline 115a. In other embodiments, these logic circuits may be included in a different pipeline that is associated with execution pipeline 115a and not execution pipeline 115b, such as load-store pipeline 220 in FIG. 2.

In response to the selecting of the prioritized program thread for dispatch to execution pipeline 115a, method 600 may further include clearing, by decode circuit 102, a ready indicator corresponding to the unselected program thread, indicating that an instruction for the unselected program thread is not ready for dispatch. For example, if program thread 132 is selected, then decode circuit 102 may cause T0 ready 440 to be cleared, thereby indicating that an instruction for program thread 130 is not ready for dispatch since this instruction uses shared circuit 117 which has just been assigned for use by program thread 132. Clearing T0 ready 440 may prevent decode circuit 102 from assigning program thread 130 to execution pipeline 115b. Instead, decode circuit 102 may dispatch a next instruction of program thread 132 to execution pipeline 115b if T1 ready 442 indicates that the next instruction is ready for dispatch.

Method 600 may end in block 630 or may return to block 610 to repeat assignments for program threads 130 and 132 to execution pipelines 115a and 115b. In some embodiments, method 600 may be followed by method 700 of FIG. 7.

Proceeding to FIG. 7, a flow diagram is illustrated that depicts an embodiment of a method for selecting thread assignments in a processor when one thread is not ready for dispatch. In a similar manner as method 600, method 700 may be used in conjunction with any of the computer circuitry, systems, devices, elements, or components disclosed herein, among others. In various embodiments, the disclosed operations may be performed in a different order than shown, including being performed concurrently or being omitted. In some embodiments, additional operations may be included. Referring collectively to FIGS. 1, 5, and 7, method 700 begins in block 710, for example, after block 630 of method 600.

At block 710, method 700 includes, in response to selecting between program thread 130 and program thread 132, updating, by decode circuit 102, a stored value indicating which of program thread 130 and program thread 132 was most recently selected. As shown, the stored value is LRU 445. In some embodiments, the updating includes setting LRU 445 to a value of '0' to indicate that program thread 130 has least recently used execution pipeline 115a (e.g., that program thread 132 was the most recently selected). A value of '1' may indicate the opposite, that program thread 132 has had the least recent assignment to execution pipeline 115a. LRU 445 may be updated such that the updated value is available for use in a following instruction cycle.

Method 700, at block 720, also includes determining, by decode circuit 102, that an instruction for program thread 132 is not ready for dispatch. In a next cycle, program thread 132, as illustrated in FIG. 5, does not have a next instruction ready for dispatch as indicated by a value of T1 ready 442. For example, the next instruction for program thread 130 (instruction 132a) may be dependent on a result from a previously dispatched instruction that is being performed in one of the execution pipelines, such as a load instruction being performed in load-store pipeline 220 of FIG. 2.

Method 700 also includes, at block 730, dispatching instructions for program thread 130 to execution pipelines 115a and 115b. As illustrated, two instructions for program thread 130 are ready for dispatch as indicated by T0 ready 440. Instructions 130a and 130b are dispatched, by decode circuit 102, to execution pipelines 115a and 115b, respectively.

At block 740, method 700 further includes updating, by decode circuit 102, the stored value to indicate that program thread 130 was most recently selected. Due to program thread 130 being assigned to both execution pipelines 115a and 115b, program thread 130 is the most recent thread to be assigned execution pipeline 115a, thereby making program thread 132 the least recent thread to use execution pipeline 115a. LRU 445 is, accordingly, updated to indicate the least recent use of execution pipeline 115a by program thread 132.

It is noted that methods 600 and 700 are merely examples for demonstrating the disclosed techniques. It is contemplated that operations of methods 600 and 700 may be interchanged as suitable. For example, block 710 of method 700 may be performed as part of method 600, e.g., as a part of, or immediately following, block 630.

Example Computer System

Processor 100 may be included within a variety of system configurations, one example of which is shown in FIG. 8. In various embodiments, system 800 may correspond to a general-purpose computer system, such as a desktop or portable computer, a mobile phone, or the like. System 800 may also correspond to any type of embedded system that may employ one or more instances of processor 100 as a dedicated controller. For example, system 800 may correspond to any type of computer peripheral device such as a mass storage device or storage array, printer, or the like, as well as control systems for automobiles, aviation, manufacturing, and other suitable applications.

As shown, system 800 includes processor 100, memory 810, storage 820, and an input/output (I/O) device interface 830 coupled via an interconnect 840. One or more I/O devices 850 are coupled via I/O interface 830. System 800 also includes a network interface 860 that may be configured to couple system 800 to a network 870 for communications with, e.g., other systems. (In various embodiments, network interface 860 may be coupled to interconnect 840 directly, via I/O interface 830, or according to a different configuration.) It is noted that some or all of the components of system 800 may be fabricated as a system-on-a-chip, although discrete combinations of components may also be employed.

Processor 100 corresponds to one or more instances of the processor configuration described above with respect to FIG. 1, or a suitable variant thereof. Memory 810 may include random-access memory (RAM) of any suitable configuration, such as working memory configured to store data and instructions usable by processor 100. Storage 820 may include mass storage devices such as magnetic, optical, or nonvolatile/flash memory storage, or a combination of these. In some embodiments, either of memory 810 or storage 820 may be omitted or integrated into the other as a single memory subsystem from the perspective of processor 100.

I/O interface 830 may be configured to interface between interconnect 840 and one or more other types of buses or interfaces. For example, interconnect 840 may correspond to the AHB interface discussed above (or another suitable type of high-bandwidth interconnect), and I/O interface 830 may be configured as a bridge device that enables coupling of different types of I/O devices to interconnect 840. I/O interface 830 may implement one or more interface protocols such as Universal Serial Bus, Firewire, or other suitable standards. I/O device(s) 850 may include any suitable type of storage, network interface, user interface, graphics processing, or other type of device. Network 870, if present, may be any suitable type of wired or wireless communications network, such as an Internet Protocol (IP) addressed local or wide-area network, a telecommunications network, or the like. Network interface 860, if present, may be configured to implement any suitable network interface protocol needed for communication with network 870.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements are defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
a shared circuit;
a plurality of execution pipelines configured to concurrently perform operations for respective instructions wherein the plurality of execution pipelines includes:
a first execution pipeline configured to access the shared circuit directly; and
a second execution pipeline configured to access the shared circuit via the first execution pipeline, wherein the second execution pipeline does not have direct access to the shared circuit; and
a decode circuit configured to:
assign a first program thread to the first execution pipeline and a second program thread to the second execution pipeline; and
select between the first program thread and the second program thread in response to determining that respective instructions from the first and second program threads are concurrently available for dispatch, wherein the respective instructions utilize the shared circuit.

2. The apparatus of claim 1, wherein the shared circuit is configured to perform a particular subset of instructions not executable by the plurality of execution pipelines, and wherein to determine that the respective instructions utilize the shared circuit, the decode circuit is further configured to determine that the respective instructions are included in the particular subset.

3. The apparatus of claim 2, wherein the decode circuit is further configured, in response to an indication that the second program thread has priority, to assign the second program thread to the first execution pipeline.

4. The apparatus of claim 1, wherein to select between the first program thread and the second program thread, the decode circuit is further configured to, prior to fetching the respective instructions, determine a priority between the first program thread and the second program thread.

5. The apparatus of claim 4, wherein to determine the priority, the decode circuit is further configured to:

utilize a stored value indicative of which of the first program thread and the second program thread were least recently fetched; and in response to making a selection between the first program thread and the second program thread, update the stored value to indicate which of the first program thread and the second program thread was selected.

6. The apparatus of claim 1, wherein the decode circuit is further configured to swap assignments of the first and second program threads between the first and second execution pipelines in response to dispatching a particular number of instructions from each thread.

7. The apparatus of claim 1, wherein the shared circuit is a load-store pipeline.

8. The apparatus of claim 1, wherein the decode circuit includes respective ready indicators that indicate whether a respective instruction is ready to dispatch for the first and second program threads, and wherein the decode circuit is further configured, in response to a selection of the first program thread, to clear the respective ready indicator corresponding to the second program thread to indicate that an instruction for the second program thread is not ready for dispatch.

9. A method comprising:
assigning, by a decode circuit, a first and a second program thread to, respectively, a first and a second execution pipeline;
accessing, by the decode circuit, a priority value indicating whether the first program thread or the second program thread has priority to use a shared circuit that is accessed via the first execution pipeline; and
in response to determining that respective available instructions from the first and second program threads would concurrently access the shared circuit, selecting, by the decode circuit using the priority value, either the first program thread or the second program thread.

10. The method of claim 9, wherein the shared circuit is included in the first execution pipeline, and further comprising, assigning the selected program thread to the first execution pipeline.

11. The method of claim 9, further comprising, in response to selecting between the first program thread and the second program thread, updating, by the decode circuit, a stored value indicating which of the first program thread and the second program thread was most recently selected.

12. The method of claim 11, further comprising:
determining, by the decode circuit, that an instruction for the first program thread is not ready for dispatch;
dispatching instructions for the second program thread to the first and second execution pipelines; and
updating, by the decode circuit, the stored value to indicate that the second program thread was most recently selected.

13. The method of claim 9, further comprising clearing, by the decode circuit, a ready indicator corresponding to the unselected program thread, indicating that an instruction for the unselected program thread is not ready for dispatch.

14. The method of claim 9, further comprising swapping, by the decode circuit, assignments of the first and second program threads between the first and second execution pipelines in response to dispatching a particular number of instructions from each thread.

15. An apparatus, comprising:
a plurality of execution pipelines, including first and second execution pipelines configured to concurrently perform operations for a first set of instruction types, wherein the first execution pipeline is further configured to perform operations for a second set of instruction types, different than the first set; and
a decode circuit configured to:
assign a first program thread to the first execution pipeline and a second program thread to the second execution pipeline; and
select between the first program thread and the second program thread in response to determining that respective instructions from the first and second program threads are concurrently available for dispatch, wherein the respective instructions are included in the second set.

16. The apparatus of claim 15, wherein to select between the first program thread and the second program thread, the decode circuit is further configured to utilize a stored value that indicates whether the first program thread or the second program thread was most recently selected.

17. The apparatus of claim 16, wherein the decode circuit is further configured to, prior to fetching the respective instructions, access the stored value.

18. The apparatus of claim 15, wherein the decode circuit is further configured to:
while the first program thread is assigned to the first execution pipeline and the second program thread is assigned to the second execution pipeline, determine that a ready-to-dispatch first instruction of the first program thread is included in the first set of instruction types and that a ready-to-dispatch second instruction of the second program thread is included in the second set of instruction types; and
swap pipeline assignments of the first and second program threads.

19. The apparatus of claim 18, wherein the decode circuit is further configured to update a stored value to indicate that the second program thread was most recently selected.

20. The apparatus of claim 15, wherein the decode circuit is further configured to:
determine that an instruction for the first program thread is not ready for dispatch; and
dispatch instructions for the second program thread to the first and second execution pipelines.

\* \* \* \* \*